Dec. 11, 1923.
C. S. ENRIGHT
1,477,434
DISPENSING MACHINE
Original Filed July 14, 1921
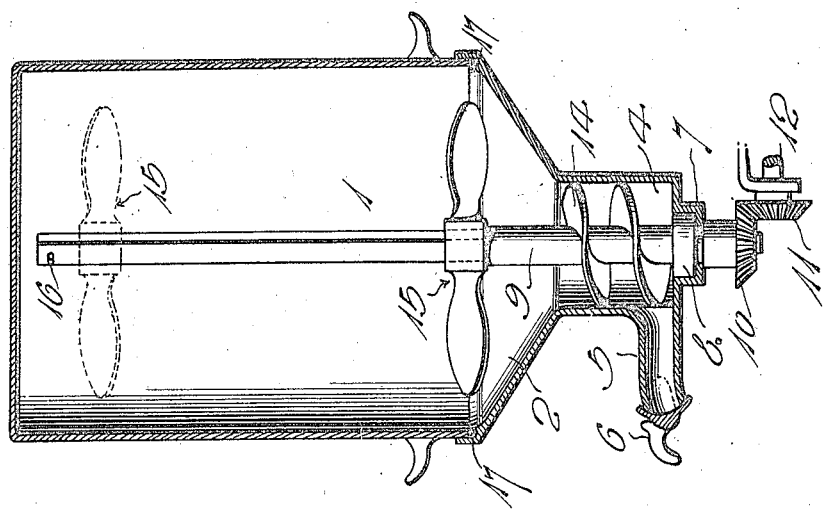
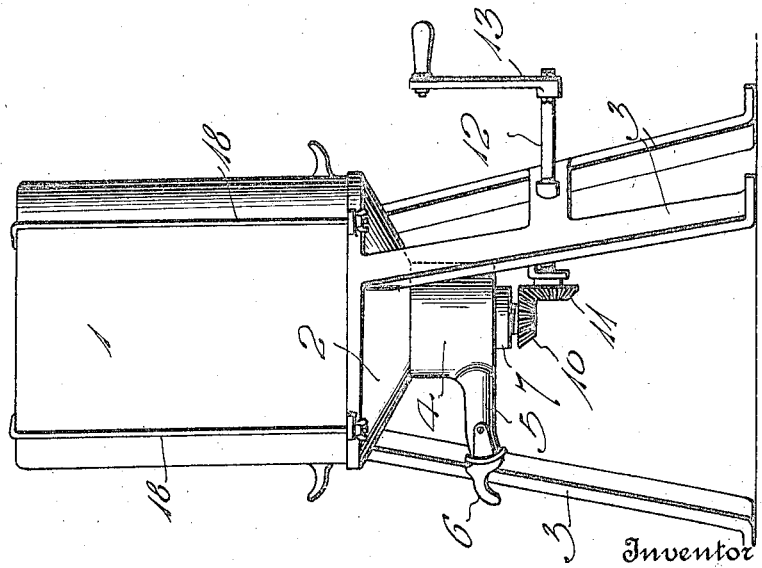
Witness
H. Woodard
Inventor
C. S. Enright
By H. B. Wilmoutes
Attorneys Patented Dec. 11, 1923.

1,477,434

UNITED STATES PATENT OFFICE.

CORNELIUS S. ENRIGHT, OF CLE ELUM, WASHINGTON.

DISPENSING MACHINE.

Application filed July 14, 1921, Serial No. 484,731. Renewed May 9, 1922. Serial No. 559,589.

*To all whom it may concern:*

Be it known that I, CORNELIUS S. ENRIGHT, a citizen of the United States, residing at Cle Elum, in the county of Kittitas and State of Washington, have invented certain new and useful Improvements in Dispensing Machines; and I do declare the following to be a full, clear, and exact description of the invention, such as will enable others skilled in the art to which it appertains to make and use the same.

This invention relates to an improved dispensing machine by means of which peanut butter, jellies, jams, honey, cottage cheese, mince-meat, mayonnaise, malt or any other product sold to the retailer in bulk may be kept sanitary and dispensed in desired quantities, and the invention has further reference to the provision of a machine so constructed that the product contained therein may be effectively stirred and its consistency thus made uniform before it is dispensed.

In carrying out the above end, a further aim is to provide a stirring element or agitator, movable while in operation, into different portions of the container so as to stir the contents with such efficiency as to insure thorough mixing thereof prior to discharging. In this connection, a still further aim is to provide an agitator or stirring element which will be self-movable into different parts of the container when operated.

Yet another object is to provide common means for operating the dispensing means of the container and for causing movement of the agitator toward either end of said container, according to the direction in which said agitator is rotated.

A further object is to provide an agitator having a pitched blade for engagement with the contents of the container, so as to not only effectively stir such contents, but to cause said agitator to work its way through the contents when it is rotated.

Another object of the invention is to so construct this dispensing device that when the dispensing means is turning in the direction to dispense the contents, the stirring blade will have a tendency to move the butter upwardly and the dispensing screw have a tendency to move the butter downwardly and then force the butter out of the outlet spout.

This invention is illustrated in the accompanying drawings, wherein:

Figure 1 is a view showing the improved dispensing device in side elevation.

Figure 2 is a vertical sectional view through the upper portion of the stand and peanut butter holding receptacle.

Peanut butter and a number of other products, when received by the retailer are contained in large cans 1 and these cans are provided with suitable covers which will be removed when the contents are to be sold. When a can is opened after having remained standing for some time, the liquid content will be principally at the top of the can and therefore the upper portion will contain too much liquid and the contents of the bottom of the can will be too dry. When the contents are removed from the can by means of a paddle, they cannot be thoroughly stirred to mix the liquid content with the solids and further the open can is exposed to dust and dirt and also the paddle is liable to gather dirt. In order to permit the contents to be readily dispensed and protected from exposure to dust and dirt and to also permit of its being stirred and thus the liquid thoroughly mixed with all of the solids, the improved dispensing means which will now be described has been provided.

This dispensing device in the form of construction herein disclosed is in the form of a stand having a hopper 2 supported by legs 3. This hopper 2 is provided with a well 4 from which extends a spout 5 having a hingedly mounted closure 6 which may be swung upwardly to an open position when the contents are to be dispensed. A bearing cup 7 is provided at the bottom of the well 4 to receive the collar 8 which is carried by the shaft 9. This shaft 9 is positioned vertically in the well and extends up through the hopper as shown in Fig. 2. At its lower end, it carries a gear 10 which engages the underface of the cup 7 and meshes with a bevel gear 11 carried by a drive shaft 12. This drive shaft 12 is provided with a turning handle 13 so that the shaft 12 may be readily turned to impart rotary movement to the shaft when it is desired to dispense the peanut butter or stir the same. A spiral dispenser 14 is carried by the shaft 9 within the cup and it will be readily seen from an inspection of Fig. 2 that when the shaft 12 is rotated to turn the shaft 9 in the direction of the arrow in Fig. 2, the contents of the can 1 will be forced downwardly in the well 4 and out through the spout 5. The upper portion of this shaft in the present form of construction is reduced and is rectangular in cross section so that the agitator or paddle wheel 15 which turns with the shaft will be slidably mounted thereon. The shoulder at the base of the rectangular portion of the shaft prevents the paddle wheel from moving downwardly beyond a position shown in Fig. 2 and the key 16 which is passed through an opening in the upper end portion of the shaft prevents the paddle wheel from moving upwardly upon the shaft beyond a desired point. It will thus be seen that the paddle wheel may slide upon the shaft but will have limited movement and will be prevented from moving downwardly beyond a desired point and also prevented from moving upwardly off of the upper end of the shaft. A gasket 17 is carried in a seat formed in the hopper 2 for engaging the edge of the can 1 and thus preventing danger of leakage between the hopper and the receptacle.

When this device is in use, the cover of the can is removed and the device will be placed upon the can with the open end portion of the can fitting into the hopper against the gasket 17. The can and stand can then be placed in the operative position shown in Fig. 1 and the securing clamps 18 applied to hold the can firmly in place. By turning the shaft 12 in a direction to turn the shaft 9 in a reverse direction to that indicated by the arrow in Fig. 2, the paddle wheel 15 will be rotated in a direction to cause its blade to cut into the contents of the can and move itself upwardly toward the dotted line position of this figure. The shaft 12 can then be turned in the direction to rotate the shaft 9 in the direction of the arrow and the paddle blade will move downwardly through the contents. By repeating this operation, the solids and liquid can be thoroughly mixed. Of course, if desired the mixing can be accomplished before the stand and can are turned to the position of Fig. 1 so that there will be no danger of the liquid accumulating in the hopper and well 4 when the device is positioned for use.

When using the device, the shaft 12 may first be turned to move the paddle blade upwardly and then reversed in its rotation so that the paddle blade moves downwardly thus mixing the product and distributing any liquid which may have accumulated in the upper portion of the can. Continued rotation of the shaft in the dispensing direction will cause the blade of the paddle wheel to stir the contents in the lower portion of the can and in the hopper and at the same time, the spiral feed 14 will force the contents through the well 4 and out through the spout 5 into a suitable receptacle. It will thus be seen that with this device a great number of products stored in bulk can be kept sanitary and further can be readily dispensed and if necessary easily and quickly stirred so as to mix the liquid and solid contents.

I wish to direct particular attention first to the fact that the agitator or stirring element 15 is movable into different portions of the container 1 while said stirring element or agitator is in operation, so that the entire contents of the can will be effectively stirred; second, to the fact that the agitator or stirring element is self-movable within the container when said stirring element or agitator is rotated; and third, to the fact that common means are provided for operating the dispensing screw 14 and for causing the agitator 15 to move toward one end of the container or the other, according to the direction in which the operating shaft is rotated. These features of novelty, it is to be clearly understood, can be carried out in connection with numerous forms of containers and while here shown supported by a hopper 2 and operating within an inverted can 1, are not restricted to this association. Futhermore, the details shown in connection with the agitator and its operating means need not be followed too closely, as within the scope of the invention as claimed, numerous changes may be made.

I claim:

1. A dispensing device including a hopper for receiving an inverted open receptacle, a vertical shaft journalled in the hopper and extending above the hopper for extending up into the receptacle carried thereby, a spiral feed carried by said shaft for feeding material out of an outlet of the hopper, and a paddle freely slidable upon the shaft and held against rotation thereon, the paddle having radiating blades pitched in an opposite direction to the pitch of the spiral feed.

2. A dispensing device including a hopper for receiving an inverted open receptacle, a cup leading from said hopper and provided with an outlet, a shaft journalled in said cup and extending up above the hopper for extending into a receptacle carried by the hopper, a spiral feed carried by the shaft in said cup for feeding material out of the cup through the outlet thereof when the shaft is rotated in one direction, and a paddle freely slidable upon the shaft and held against rotation thereon and having blades pitched at an angle to impart sliding movement to the paddle longitudinally of the shaft through engagement with the contents of the receptacle when the shaft is rotated.

3. A dispensing device including a hopper for receiving an inverted open receptacle, a cup leading from said hopper and provided with an outlet, a shaft journalled in said cup and extending up above the hopper for extending into a receptacle carried by the hopper, means carried by the shaft for feeding material out of the cup through the outlet when the shaft is rotated in one direction, and a stirring element freely slidable upon the shaft and having movement longitudinally thereon through engagement with the contents of the receptacle when the shaft is rotated in one direction.

4. A dispensing device including a hopper for receiving an inverted open receptacle, a shaft journalled in said hopper and extending up above the hopper for extending into a receptacle carried by the hopper, means carried by the shaft for feeding material out of the hopper when the shaft is rotated in one direction, and a stirring element freely slidable upon the shaft and held against rotation thereon, rotation of the shaft in one direction retaining the stirring element in a lowered position while material is being fed out of the hopper and rotation of the shaft in a reverse direction moving the stirring element upwardly through engagement of the stirring element with the contents of the receptacle.

5. A dispensing device including a hopper for receiving an inverted open receptacle, the hopper being provided with an outlet, a shaft journalled in said hopper and extending up above the hopper for extending into a receptacle carried by the hopper, means carried by the shaft for feeding material through the outlet of the hopper when the shaft is rotated in one direction, and a stirring element freely slidable upon the shaft and held against rotation thereon, rotation of the shaft in one direction retaining the stirring element in a lowered position and forcing the material in the lower portion of the receptacle upwardly and outwardly and moving the feeding means to force the material out through the outlet of the hopper.

6. A dispensing device including a hopper for receiving an inverted open receptacle, a shaft journalled in the bottom of the hopper and extending upwardly above the hopper for extending into a receptacle carried by the hopper, the upper portion of the shaft being reduced and polysided in cross section, a paddle freely slidable upon the reduced portion of the shaft and movable longitudinally thereon through engagement with the contents of the receptacle when the shaft is rotated in one direction, means for feeding material out of the hopper and means for rotating said shaft.

7. In a structure of the character described, a receptacle, a rotatable shaft extending into the receptacle and a pitched stirring element freely slidable upon said shaft and held against rotation thereon and having movement longitudinally thereof through engagement with the contents of the receptacle when the shaft is rotated.

8. A structure of the character described, including a hopper for receiving an inverted open receptacle, a shaft journaled in said hopper and extending up above the hopper for extending into the receptacle carried by the hopper, and a mixing element freely slidable upon said shaft and held against rotation thereon, said mixing element including blades pitched at an incline to impart sliding movement to the mixing element longitudinally of the shaft through engagement with the contents of the receptacle when the shaft is rotated.

9. In a structure of the character described, a hopper having an outlet, a receptacle communicating with said hopper, a rotatable shaft extending into said receptacle, a stirring member freely slidable upon said shaft and held against rotation thereon and having sliding movement longitudinally of the shaft in the receptacle through engagement with the contents of the receptacle when the shaft is rotated, and means operated by said shaft for feeding material out of the outlet of the hopper when the shaft is rotated in one direction.

10. In a device of the class described, a receptacle, an agitator therein, and means for operating said agitator; means being provided for engaging the contents of the receptacle and thereby automatically moving said agitator into different portions of said receptacle while in operation.

11. In a device of the class described, a receptacle, and an agitator therein self-movable by engagement with the contents of the receptacle into different portions of said receptacle, when operated.

12. In a device of the class described, a receptacle, an agitator therein, and means for operating said agitator, the latter being provided with means for engaging the contents of the receptacle and thereby automatically moving the agitator into different portions of said receptacle when operated.

13. A device of the class described, comprising a receptacle, a shaft extending into said receptacle, a pitched agitator in said receptacle carried by said shaft and non-rotatable thereon, and means for rotating said shaft and agitator to cause the latter to move axially through the contents of the receptacle by engagement with such contents.

14. A device of the class described comprising a receptacle having an outlet, dispensing means for extruding the contents of the receptacle through said outlet, a rotatable agitator in said receptacle movable toward one end or the other of said receptacle according to the direction in which it is rotated, and common means for operating said dispensing means and rotating said agitator in either direction.

15. A device of the class described comprising a receptacle having an outlet, dispensing means for extruding the contents of the receptacle through said outlet, a rotatable agitator in said receptacle movable toward one end or the other of said receptacle according to the direction in which it is rotated, and a common shaft on which said agitator and said dispensing means are mounted, said shaft being provided with means for rotating it in either direction, whereby the agitator may be moved toward either end of the receptacle and the dispensing means simultaneously actuated.

In testimony whereof I have hereunto set my hand.

CORNELIUS S. ENRIGHT.